(12) United States Patent
MacNeil et al.

(10) Patent No.: US 11,298,872 B2
(45) Date of Patent: Apr. 12, 2022

(54) REMOVABLE BUILD PLATE FOR THREE-DIMENSIONAL PRINTERS

(71) Applicant: MakerBot Industries, LLC, Brooklyn, NY (US)

(72) Inventors: Eric Justin MacNeil, New York, NY (US); Samuel Holland, Brooklyn, NY (US); Vishnu Anantha, Brooklyn, NY (US)

(73) Assignee: MakerBot Industries, LLC, Brooklyn, NY (US)

( * ) Notice: Subject to any disclaimer, the term of this patent is extended or adjusted under 35 U.S.C. 154(b) by 216 days.

(21) Appl. No.: 16/570,372

(22) Filed: Sep. 13, 2019

(65) Prior Publication Data

US 2020/0086569 A1 Mar. 19, 2020

Related U.S. Application Data

(60) Provisional application No. 62/777,587, filed on Dec. 10, 2018, provisional application No. 62/731,551, filed on Sep. 14, 2018.

(51) Int. Cl.
*B29C 64/118* (2017.01)
*B33Y 30/00* (2015.01)
(Continued)

(52) U.S. Cl.
CPC .......... *B29C 64/118* (2017.08); *B29C 64/209* (2017.08); *B29C 64/232* (2017.08); *B29C 64/236* (2017.08); *B29C 64/245* (2017.08); *B29C 64/295* (2017.08); *B29C 64/321* (2017.08); *B29C 64/35* (2017.08); *B29C 64/379* (2017.08); *B29C 64/393* (2017.08); *B33Y 30/00* (2014.12); *B33Y 40/00* (2014.12); *B33Y 50/02* (2014.12); *B29C 64/182* (2017.08); *B33Y 10/00* (2014.12)

(58) Field of Classification Search
CPC ... B29C 64/245; B29C 67/0092; B29C 64/40; B29C 64/20
See application file for complete search history.

(56) References Cited

U.S. PATENT DOCUMENTS

D223,098 S  3/1972 Catalano et al.
D224,683 S  8/1972 Wada et al.
(Continued)

FOREIGN PATENT DOCUMENTS

CN  104589649  5/2015
CN  105291436  2/2016
(Continued)

OTHER PUBLICATIONS

J.M.K.C. Donev et al. (2020). Energy Education—Thermal conductivity [Online], Available: https://energyeducation.ca/encyclopedia/Thermal_conductivity. (Year: 2020).*
(Continued)

*Primary Examiner* — Joseph S Del Sole
*Assistant Examiner* — Ariella Machness
(74) *Attorney, Agent, or Firm* — Strategic Patents, P.C.

(57) ABSTRACT

A removable and replaceable build plate for a three-dimensional printer supports magnetic coupling to a printer and advantageous adhesion for an initial layer of build material.

14 Claims, 9 Drawing Sheets

(51) Int. Cl.
*B33Y 40/00* (2020.01)
*B29C 64/245* (2017.01)
*B29C 64/236* (2017.01)
*B33Y 10/00* (2015.01)
*B29C 64/379* (2017.01)
*B29C 64/232* (2017.01)
*B29C 64/209* (2017.01)
*B29C 64/321* (2017.01)
*B29C 64/35* (2017.01)
*B29C 64/295* (2017.01)
*B29C 64/393* (2017.01)
*B33Y 50/02* (2015.01)
*B29C 64/182* (2017.01)

(56) References Cited

U.S. PATENT DOCUMENTS

| | | | |
|---|---|---|---|
| D228,789 S | 10/1973 | Koni et al. | |
| D346,379 S | 4/1994 | Patel et al. | |
| D352,510 S | 11/1994 | Sutton et al. | |
| D367,050 S | 2/1996 | Koizumi et al. | |
| 5,764,521 A | 6/1998 | Batchelder et al. | |
| 7,448,739 B2 | 11/2008 | Hibbard et al. | |
| 7,625,200 B2 | 12/2009 | Leavitt | |
| 8,002,384 B2 | 8/2011 | Hibbard et al. | |
| 8,663,533 B2 | 3/2014 | Swanson et al. | |
| 9,233,506 B2 | 1/2016 | Leavitt | |
| 9,744,730 B2 | 8/2017 | Comb | |
| 10,124,539 B2 | 11/2018 | Batchelder et al. | |
| 2005/0173855 A1* | 8/2005 | Dunn | B29C 64/40 269/291 |
| 2007/0126814 A1 | 6/2007 | Hibbard et al. | |
| 2007/0126818 A1 | 6/2007 | Hibbard et al. | |
| 2007/0126841 A1 | 6/2007 | Hibbard et al. | |
| 2007/0228590 A1 | 10/2007 | LaBossiere et al. | |
| 2010/0166969 A1 | 7/2010 | Batchelder | |
| 2014/0159284 A1 | 6/2014 | Leavitt | |
| 2014/0363532 A1 | 12/2014 | Wolfgram | |
| 2015/0145174 A1* | 5/2015 | Comb | G03G 15/24 264/464 |
| 2016/0263830 A1 | 9/2016 | Batchelder et al. | |
| 2018/0022044 A1* | 1/2018 | Dulkiewicz | B29C 64/40 425/375 |
| 2019/0030806 A1 | 1/2019 | Herman et al. | |
| 2019/0047221 A1* | 2/2019 | Baltes | B29C 64/379 |
| 2019/0322047 A1 | 10/2019 | Riha et al. | |
| 2019/0366723 A1 | 12/2019 | Nagashima et al. | |
| 2020/0079014 A1 | 3/2020 | Migliori et al. | |
| 2020/0086552 A1 | 3/2020 | Yarka | |
| 2020/0086566 A1 | 3/2020 | Goodman et al. | |
| 2020/0086577 A1 | 3/2020 | Pappas et al. | |
| 2020/0130277 A1 | 4/2020 | Thorpe et al. | |

FOREIGN PATENT DOCUMENTS

| | | |
|---|---|---|
| DE | 202019102983 | 8/2019 |
| WO | WO-2020056300 | 3/2020 |

OTHER PUBLICATIONS

"U.S. Appl. No. 29/684,121 Non-Final Office Action dated Mar. 5, 2020", 11 pages.

ISA, "International Application Serial No. PCT/US19/51066, International Search Report and Written Opinion dated Feb. 3, 2020", 22 pages.

ISA, "International Application Serial No. PCT/US19/51066, Invitation to Pay Fees and Partial Search Report dated Dec. 12, 2019", 16 pages.

"MakerBot_Spring_Steel_Build_Plate_for_Method_3D_Printing", CDW 2020, 2 pages.

Stratasys, "Tip Shield", Stratasys Technical Disclosure 09-001, 1 page.

Hannfin, Parker, "Coefficient of Thermal Expansion", https://promo.parker.com/promotionsite/oring-ehandbook/us/en/ehome/Coefficient-of-Thermal-Expansion Sep. 7, 2015, 2 pages.

Wright, John E., "Tip Shields", uPrint SE & uPrint SE Plus, https://www.youtube.com/watch?v=y4aXvAWDXkQ Apr. 9, 2014, 1 page.

"Engineering Tool Box, Coefficients of Linear Thermal Expansion", [online] Available at: https://www.engineeringtoolbox.com/linear-expansion-coefficients-d_95.html 2003, 10 pages.

"Engineering ToolBox, Thermal Conductivity of some selected Materials and Gases", [online] Available at: https://www.engineeringtoolbox.com/thermal-conductivity-d_429.html 2003, 13 pages.

"Thermo Fisher Scientific, Material Safety Data Sheet Poly(tetrafluoroethylene)", Jan. 19, 2018, 6 pages.

"RGP Balls, Viton Rubber Balls", https://www.rgpballs.com/en/viton-rubber-balls/ Feb. 7, 2013, 2 pages.

"U.S. Appl. No. 16/570,435 Non-Final Office Action dated Feb. 23, 2021", 35 pages.

WIPO, "Application No. PCT/US19/51066 International Preliminary Report on Patentability dated Mar. 26, 2021", 15 pages.

"U.S. Appl. No. 29/684,121 Notice of Allowance dated Jul. 6, 2020", 8 pages.

* cited by examiner

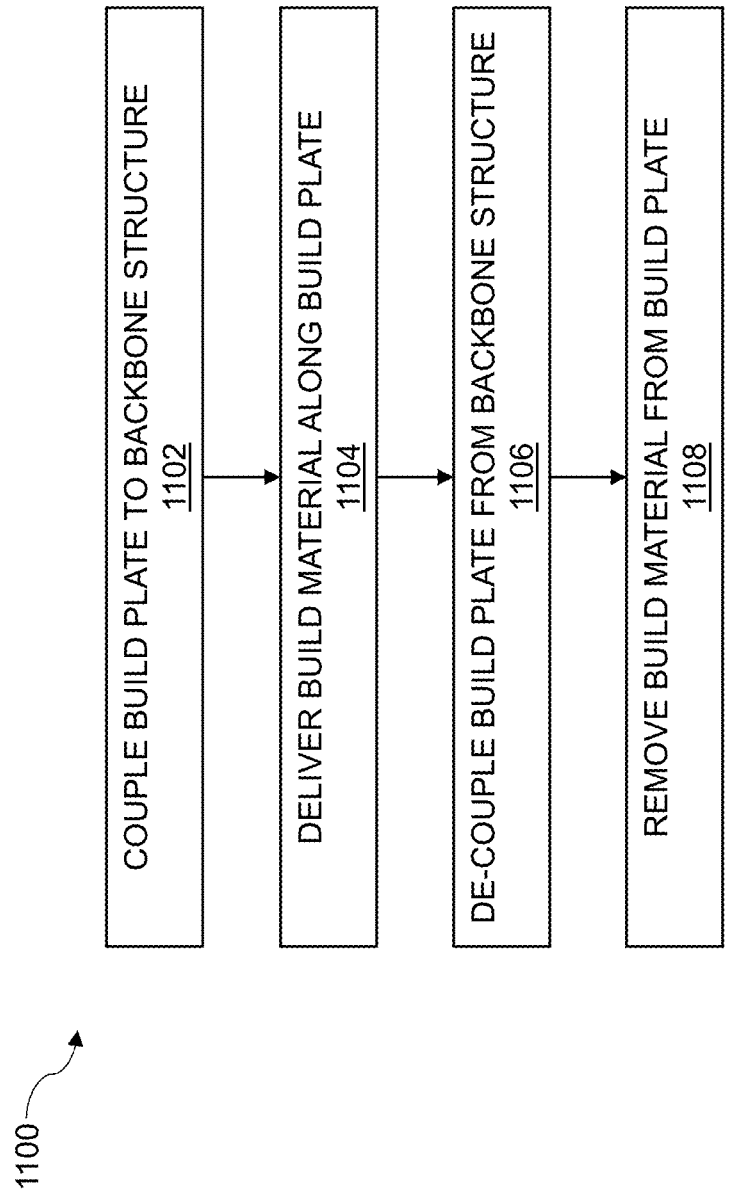

REMOVABLE BUILD PLATE FOR THREE-DIMENSIONAL PRINTERS

CROSS-REFERENCE TO RELATED APPLICATIONS

This application claims priority to U.S. Provisional Application No. 62/731,551 filed on Sep. 14, 2018 and U.S. Provisional Application No. 62/777,587 filed on Dec. 10, 2018, where the entire contents of each of the foregoing applications are hereby incorporated by reference.

FIELD

The present disclosure generally relates to three-dimensional printing, and more specifically to build plates for three-dimensional printers.

BACKGROUND

Build plates for three-dimensional printers generally provide a stable, level surface for fabricating objects. However, build plates that are designed for this purpose often omit user-friend features that promote comfort, ease of handling, easy removal of printed parts, and so forth. There remains a need for improved build plates for three-dimensional printers.

SUMMARY

A removable and replaceable build plate for a three-dimensional printer supports magnetic coupling to a printer and advantageous adhesion for an initial layer of build material.

In one aspect, a build plate disclosed herein for a three-dimensional printer includes a sheet of an elastically flexible material including a ferromagnetic metal, and a frame around at least a portion of a perimeter of the sheet, the frame formed of an elastomeric material that elastically flexes with the sheet, the elastomeric material having a low thermal conductivity relative to the sheet and the elastomeric material positioned to insulate an exposed surface of the frame from a temperature of the sheet. The build plate also includes one or more tabs of the elastomeric material extending from the frame to provide gripping surfaces for removal of the build plate from the three-dimensional printer.

Implementations may include one or more of the following features. The frame may define a recess graspable by fingertips of a user. The frame may be disposed over the entire perimeter of the sheet. Each of the one or more tabs may have a first surface roughness, and the frame may have a second surface roughness less than the first surface roughness. The build plate may further include a polycarbonate layer disposed over at least one surface of a build section of the sheet. The ferromagnetic metal may include spring steel. The elastically flexible material of the sheet may have a first thermal conductivity and the elastomeric material of the frame may have a second thermal conductivity, where the first thermal conductivity is greater than the second conductivity at room temperature.

In one aspect, a build plate disclosed herein for a three-dimensional printer includes a sheet having a build section that is substantially planar in the absence of an external force, the sheet formed of a first material along the build section, the first material including a ferromagnetic component, and the first material having a first thermal conductivity. The build plate also includes a frame along at least a portion of a perimeter region of the sheet, the frame at least as flexible as the sheet, and the frame including a second material having a second thermal conductivity less than the first thermal conductivity of the first material. The build plate also includes one or more tabs coupled to the frame, each tab thermally insulated from the first material of the sheet by at least the second material of the frame, and each tab graspable by a user to move the build plate.

Implementations may include one or more of the following features. In response to torque about any axis extending through the sheet and the frame at room temperature, the sheet may have a first torsional stiffness, and the frame may have a second torsional stiffness less than or equal to the first torsional stiffness of the sheet. The second material of the frame may include an elastomeric material. The second material may include a thermoplastic elastomer.

In one aspect, a build plate system of a three-dimensional printer disclosed herein includes a build plate including a sheet having a build section, the sheet formed of a material including a ferromagnetic component along the build section. The build plate system also includes a backbone structure including a body and a plurality of magnets supported by the body, the build plate coupled to the backbone structure via a magnetic force of the plurality of magnets exerted in a first direction on the ferromagnetic component along the build section of the sheet, and the sheet of the build plate slidable relative to the body in a second direction perpendicular to the first direction of the magnetic force.

Implementations may include one or more of the following features. The sheet of the build plate may be slidable relative to the body in the second direction under force of thermal expansion of the sheet of the build plate. The body of the backbone structure may include a substantially planar surface, and the sheet of the build plate may be slidable relative to the body, in the second direction, along the substantially planar surface. The build plate system may further include a ramp on the substantially planar surface and extending in a direction away from the substantially planar surface, the ramp oriented to separate a region of the build plate from the backbone structure as the build plate is moved in the direction away from the substantially planar surface. The build section of the sheet of the build plate coupled to the backbone structure via the magnetic force may have a flatness of greater than about 0.2 mm and less than about 0.4 mm from planar at a temperature of about 80° Celsius.

In one aspect, a method disclosed herein includes coupling a build plate to a backbone structure via a magnetic force between the build plate and the backbone structure, the magnetic force exerted in a first direction on a build section of the build plate; delivering a build material along the build section of the build plate coupled to the backbone structure; with the build material along the build section of the build plate, decoupling the build plate from the backbone structure through movement including sliding the build plate relative to the backbone structure in a second direction perpendicular to the first direction of the magnetic force; and removing the build material from the build section of the build plate decoupled from the backbone structure.

Implementations may include one or more of the following features. Delivering the build material along the build section of the build plate may include thermally expanding the build plate, and a force of thermal expansion of the build plate moving the build section relative to the backbone structure in the second direction perpendicular to the first direction of the magnetic force with the build plate coupled to the backbone structure. Under the force of thermal expansion of the build plate moving the build section relative to the backbone structure, the build section of the build plate may retain a flatness of greater than about 0.2 mm and less than about 0.4 mm at a temperature of about 80° Celsius. Decoupling the build plate from the backbone structure may include moving the build plate along a ramp defined by the backbone structure, the ramp having a first dimensional component in the first direction and a second dimensional component in the second direction.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

FIG. 11 is a flow chart of a method for using a build plate system of a three-dimensional printer.

DESCRIPTION

Figure 1:
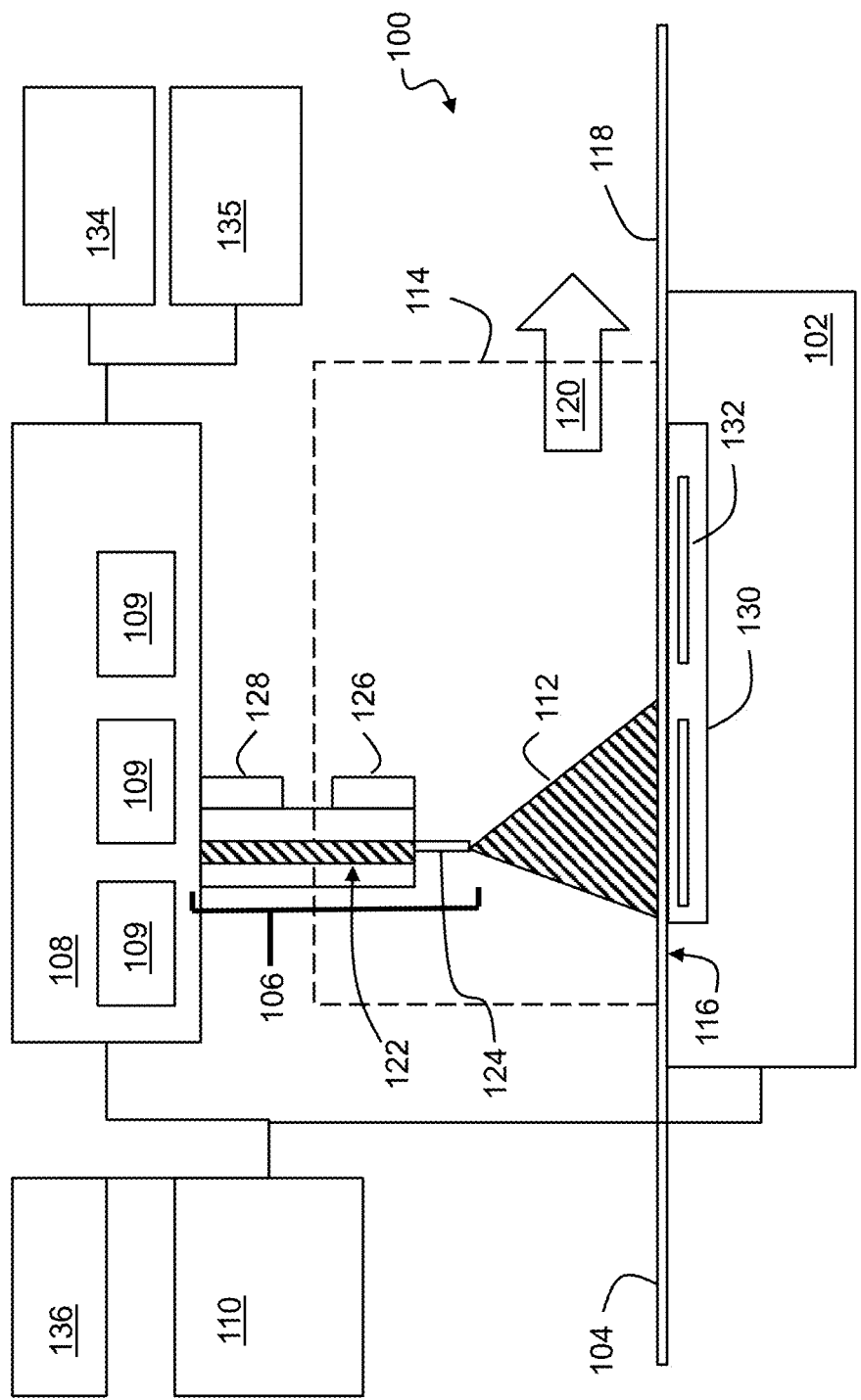
FIG. 1 is a block diagram of a three-dimensional printer.

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms unless specifically stated to the contrary.

Described herein are devices, systems, and methods for improvements in three-dimensional printing, such as improvements generally related to a build plate for a three-dimensional printer.

The following description emphasizes three-dimensional printers using fused deposition modeling or similar techniques where a bead of material is extruded in a layered series of two dimensional patterns as "roads" or "paths" to form a three-dimensional object from a digital model. It will be understood, however, that numerous additive fabrication techniques are known in the art including, without limitation, multijet printing, stereolithography, Digital Light Processor ("DLP") three-dimensional printing, selective laser sintering, and so forth. Such techniques may benefit from the systems and methods described below, and all such printing technologies are intended to fall within the scope of this disclosure, and within the scope of terms such as "printer," "three-dimensional printer," "fabrication system," and so forth, unless a more specific meaning is explicitly provided or otherwise clear from the context.

FIG. 1 is a block diagram of a three-dimensional printer. In general, a printer 100 may include a build platform 102, a conveyor 104, an extruder 106, an x-y-z positioning assembly 108, and a controller 110 that cooperate with one another to fabricate an object 112 within a working volume 114 of the printer 100.

The build platform 102 may include a surface 116 that is rigid and substantially planar. The surface 116 may support the conveyer 104 to provide a fixed, dimensionally and positionally stable platform on which to build the object 112.

The build platform 102 may include a thermal element 130 that controls the temperature of the build platform 102 through one or more active devices 132 such as thermoelectric heating and/or cooling devices (e.g., resistive elements that convert electrical current into heat, Peltier effect devices that can create a heating or cooling affect, and combinations thereof). Accordingly, the thermal element 130 may be a heater that provides active heating to the build platform 102, a cooling element that provides active cooling to the build platform 102, or a combination of these. The heater 130 may be coupled in a communicating relationship with the controller 110 for the controller 110 to controllably impart heat to or remove heat from the surface 116 of the build platform 102. Thus, for example, the thermal element 130 may include an active cooling element positioned within or adjacent to the build platform 102 to controllably cool the build platform 102.

It will be understood that a variety of other techniques may additionally, or alternatively, be employed to control a temperature of the build platform 102. For example, the build platform 102 may use a gas cooling or gas heating device such as a vacuum chamber in an interior thereof, which may be quickly pressurized to heat the build platform 102 or vacated to cool the build platform 102 as desired. As another non-exclusive example, a stream of heated or cooled gas may be applied directly to the build platform 102 before, during, and/or after a build process.

The conveyer 104 may include a sheet 118 of material that moves in a path 120 through the working volume 114. Within the working volume 114, the path 120 may pass proximal to the surface 116 of the build platform 102—that is, resting directly on or otherwise supported by the surface 116—to provide a rigid, positionally stable working surface for a build. It will be understood that, while the path 120 is depicted as a unidirectional arrow, the path 120 may be bidirectional, such that the conveyer 104 can move, for example, in either of two opposing directions through the working volume 114. It will also be understood that the path 120 may curve in any of a variety of ways, such as by looping underneath and around the build platform 102, over and/or under rollers, or around delivery and take up spools for the sheet 118 of material. Thus, while the path 120 may be generally (but not necessarily) uniform through the working volume 114, the conveyer 104 may move in any direction suitable for moving completed items from the working volume 114. The conveyer 104 may, additionally or alternatively, include a motor or other similar drive mechanism (not shown) coupled to the controller 110 to control movement of the sheet 118 of material along the path 120. Various drive mechanisms are described in further detail below.

In general, the sheet 118 may be formed of a flexible material such as a mesh material, a polyamide, a polyethylene terephthalate (commercially available in bi-axial form as MYLAR), a polyimide film (commercially available as KAPTON), or any other suitably strong polymer or other material. The sheet 118 may have a thickness of about three to about seven thousandths of an inch, or any other thickness that permits the sheet 118 to follow the path 120 of the conveyer 104. For example, with sufficiently strong material, the sheet 118 may have a thickness of about one to about three thousandths of an inch. The sheet 118 may further, or instead, include sections of rigid material joined by flexible links.

A working surface of the sheet 118 (e.g., an area on the top surface of the sheet 118 within the working volume 114) may be treated to assist with adhesion of build material to the surface 118 and/or to facilitate removal of completed objects from the surface 118. For example, the working surface may be abraded or otherwise textured (e.g., with grooves, protrusions, and the like) to improve adhesion between the working surface and the build material.

A variety of chemical treatments may be used on the working surface of the sheet 118 of material to facilitate build processes as described herein. For example, the chemical treatment may include deposition of material that can be chemically removed from the conveyer 104 by use of water, solvents, or the like. This may facilitate separation of a completed object from the conveyer by dissolving the layer of chemical treatment between the object 112 and the conveyor 104. The chemical treatments may include deposition of a material that easily separates from the conveyer such as a wax, mild adhesive, or the like. The chemical treatment may include a detachable surface such as an adhesive that is sprayed onto the conveyer 104 prior to fabrication of the object 112.

In one aspect, the conveyer 104 may include a sheet of disposable, one-use material fed from a dispenser and consumed with each successive build.

In one aspect, the conveyer 104 may include a number of different working areas with different surface treatments adapted for different build materials or processes. For example, different areas may have different textures (e.g., smooth, abraded, grooved, etc.). Additionally, or alternatively, different areas may be formed of different materials. Further, or instead, different areas may have or receive different chemical treatments. Thus, it should be appreciated that a single conveyer 104 may be used in a variety of different build processes by selecting the various working areas as needed or desired.

The extruder 106 may include a chamber 122 in an interior thereof to receive a build material. The build material may, for example, include acrylonitrile butadiene styrene ("ABS"), high-density polyethylene ("HDPL"), polylactic acid, or any other suitable plastic, thermoplastic, or other material that can usefully be extruded to form a three-dimensional object. The extruder 106 may include an extrusion tip 124 defining an exit port with a circular, oval, slotted or other cross-sectional profile that extrudes build material in a desired cross-sectional shape.

The extruder 106 may include a heater 126 to melt build materials (e.g., thermoplastic material) within the chamber 122 for extrusion through the extrusion tip 124 in melted form. While illustrated in block form, it will be understood that the heater 126 may include, e.g., coils of resistive wire wrapped about the extruder 106, one or more heating blocks with resistive elements to heat the extruder 106 with applied current, an inductive heater, or any other arrangement of heaters suitable for creating heat within the chamber 122 to melt the build material for extrusion. The extruder 106 may also, or instead, include a motor 128 to push the build material into the chamber 122, through the extrusion tip 124, or a combination thereof.

In general operation (and by way of example rather than limitation), a build material, such as ABS plastic in filament form, may be fed into the chamber 122 from a spool by the motor 128, melted by the heater 126, and extruded from the extrusion tip 124. By controlling process parameters (e.g., one or more of a rate of the motor 128 and the temperature of the heater 126) the build material may be extruded at a controlled volumetric rate. It will be understood that a variety of techniques may be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure. Other techniques may be employed for three-dimensional printing, including extrusion-based techniques using a build material that is curable and/or a build material of sufficient viscosity to retain shape after extrusion.

The x-y-z positioning assembly 108 may generally be movable to three-dimensionally position the extruder 106 and the extrusion tip 124 within the working volume 114. Thus, for example, by controlling the volumetric rate of delivery for the build material and the x, y, z position of the extrusion tip 124, the object 112 may be fabricated in three dimensions by depositing successive layers of material in two-dimensional patterns derived (e.g., two-dimensional patterns derived from cross-sections of a computer model or other computerized representation of the object 112). The x-y-z positioning assembly 108 may, for example, include a number of stepper motors 109 to control independently a position of the extruder within the working volume along each of an x-axis, a y-axis, and a z-axis. More generally, the x-y-z positioning assembly 108 may include, without limitation, various combinations of stepper motors, encoded DC motors, gears, belts, pulleys, worm gears, threads, and the like. Any such arrangement suitable for controllably positioning the extruder 106 within the working volume 114 may be adapted to use with the printer 100 described herein.

By way of example and not limitation, the conveyor 104 may be affixed to a bed that provides x-y positioning within the plane of the conveyor 104, while the extruder 106 can be independently moved along a z-axis. Additionally, or alternatively, the conveyor 104 may be x, y, and z positionable, and the extruder 106 may be, optionally, stationary. Further, or instead, the extruder 106 may be x, y, and z positionable while the conveyer 104 remains fixed (relative to the working volume 114). In yet another example, the conveyor 104 may, by movement of the sheet 118 of material, control movement in one axis (e.g., the y-axis), while the extruder 106 moves in the z-axis as well as one axis in the plane of the sheet 118. Thus, in certain instances, the conveyor 104 may be attached to and move with at least one of an x-axis stage (that controls movement along the x-axis), a y-axis stage (that controls movement along a y-axis), and a z-axis stage (that controls movement along a z-axis) of the x-y-z positioning assembly 108. More generally, any arrangement of motors and other hardware controllable by the controller 110 may serve as the x-y-z positioning assembly 108 in the printer 100 described herein. Still more generally, while an x, y, z coordinate system may serve as a convenient basis for positioning within three dimensions, any other coordinate system or combination of coordinate systems may also or instead be employed, such as a positional controller and assembly that operates according to cylindrical or spherical coordinates.

The controller 110 may be electrically coupled in a communicating relationship with the build platform 102, the conveyer 104, the x-y-z positioning assembly 108, and the other various components of the printer 100. In general, the controller 110 is operable to control the components of the printer 100, such as the build platform 102, the conveyer 104, the x-y-z positioning assembly 108, and any other components of the printer 100 described herein to fabricate the object 112 from the build material. The controller 110 may include any combination of software and/or processing circuitry suitable for controlling the various components of the printer 100 described herein including, without limitation, microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and the like. In one aspect, the controller 110 may include a microprocessor or other processing circuitry with sufficient computational power to provide related functions such as executing an operating system, providing a graphical user interface (e.g., to a display coupled to the controller 110 or printer 100), convert three-dimensional models into tool instructions, and operate a web server or otherwise host remote users and/or activity through a network interface 136 described below.

A variety of additional sensors may be usefully incorporated into the printer 100 described above. These are generically depicted as sensor 134 in FIG. 1, for which the positioning and mechanical/electrical interconnections with other elements of the printer 100 will depend upon the type and purpose of the sensor 134 and will be readily understood and appreciated by one of ordinary skill in the art. The sensor 134 may include a temperature sensor positioned to sense a temperature of the surface of the build platform 102. This may, for example, include a thermistor embedded within or attached below the surface of the build platform 102. This may also or instead include an infrared detector directed at the surface 116 of the build platform 102 or the sheet 118 of material of the conveyor 104. Other sensors that may be usefully incorporated into the printer 100 as the sensor 134 include, without limitation, a heat sensor, a volume flow rate sensor, a weight sensor, a sound sensor, and a light sensor. Certain more specific examples are provided below by way of example and not of limitation.

The sensor 134 may include a sensor to detect a presence (or absence) of the object 112 at a predetermined location on the conveyer 104. This may include an optical detector in a beam-breaking configuration to sense the presence of the object 112 at a location such as an end of the conveyer 104. This may also or instead include an imaging device and image processing circuitry to capture an image of the working volume 114 and analyze the image to evaluate a position of the object 112. This sensor 134 may be used, for example, to ensure that the object 112 is removed from the conveyor 104 prior to beginning a new build at that location on the working surface (e.g., the surface 116 of the build platform 102). Thus, the sensor 134 may be used to determine whether an object is present that should not be, or to detect when an object is absent, or a combination thereof. The feedback from this sensor 134 may be used by the controller 110 to issue processing interrupts or otherwise control operation of the printer 100.

The sensor 134 may include a sensor that detects a position of the conveyer 104 along the path. This information may be obtained, for example, from an encoder in a motor that drives the conveyer 104, or using any other suitable technique such as a visual sensor and corresponding fiducials (e.g., visible patterns, holes, or areas with opaque, specular, transparent, or otherwise detectable marking) on the sheet 118.

The sensor 134 may include a heater (e.g., a radiant heater or forced hot air) to heat the working volume 114 to maintain the object 112 at a fixed, elevated temperature throughout a build. The sensor 134 may also, or instead, include a cooling element to maintain the object 112 at a predetermined sub-ambient temperature throughout a build. It should be appreciated that a heater included in the sensor 134 may be instead of, or in addition to, the thermal element 130.

The sensor 134 may also or instead include at least one video camera. The video camera may generally capture images of the working volume 114, the object 112, or any other hardware associated with the printer 100. The video camera may provide a remote video feed through the network interface 136. In such instances, the feed may be available to remote users through a user interface maintained, for example, by remote hardware, or, further or instead, the feed may be available within a web page provided by a web server hosted by the three-dimensional printer 100. Thus, in certain implementations, there is a user interface adapted to present a video feed from at least one video camera of a three-dimensional printer to a remote user through a user interface.

The sensor 134 may also or instead include more complex sensing and processing systems or subsystems, such as a three-dimensional scanner using optical techniques (e.g., stereoscopic imaging, or shape from motion imaging), structured light techniques, or any other suitable sensing and processing hardware that might extract three-dimensional information from the working volume 114. In some instances, the sensor 134 may include a machine vision system that captures images and analyzes image content to obtain information about the status of a job, working volume 114, or an object 112 therein. The machine vision system may support a variety of imaging-based automatic inspection, process control, and/or robotic guidance functions for the three-dimensional printer 100 including, without limitation, pass/fail decisions, error detection (and corresponding audible or visual alerts), shape detection, position detection, orientation detection, collision avoidance, and combinations thereof.

The printer 100 may include other hardware 135, which may be, for example, input devices including any one or more of the following: a keyboard, a touchpad, a mouse, switches, dials, buttons, and motion sensors. Additionally, or alternatively, the other hardware 135 may be, for example, output devices including any one or more of the following: a display, a speaker or other audio transducer, and light emitting diodes. Other hardware 135 may also or instead include a variety of cable connections and/or hardware adapters for connecting, for example, to external computers, external hardware, external instrumentation data acquisition systems, and combinations thereof.

The printer 100 may include, or be connected in a communicating relationship with, the network interface 136. The network interface 136 may include any combination of hardware and software suitable for coupling the controller 110 and other components of the printer 100 to a remote computer in a communicating relationship through a data network. By way of example and not limitation, this may include electronics for a wired or wireless Ethernet connection operating according to the IEEE 802.11 standard (or any variation thereof), or any other short or long-range wireless networking components. This may include hardware for short range data communications such as Bluetooth or an infrared transceiver, which may be used to couple into a local area network that is, in turn, coupled to a data network such as the Internet. This may also, or instead, include hardware/software for a WiMAX connection or a cellular network connection (using, e.g., CDMA, GSM, LTE, or any other suitable protocol or combination of protocols). The controller 110 may be configured to control participation by the printer 100 in any network to which the network interface 136 is connected, such as by autonomously connecting to the network to retrieve printable content, or responding to a remote request for status or availability.

Specific improvements to three-dimensional printing, e.g., using a three-dimensional printer as described above with reference to FIG. 1, will now be discussed.

Specifically, an aspect of the present teachings includes a removable and replaceable build plate for a three-dimensional printer such as that described above with reference to FIG. 1. The build plate may include any of the features of the build platform described above with reference to FIG. 1. In general, the build plate may support magnetic (or other) coupling to a printer and advantageous adhesion for an initial layer of build material in a three-dimensional print.

Figure 2:
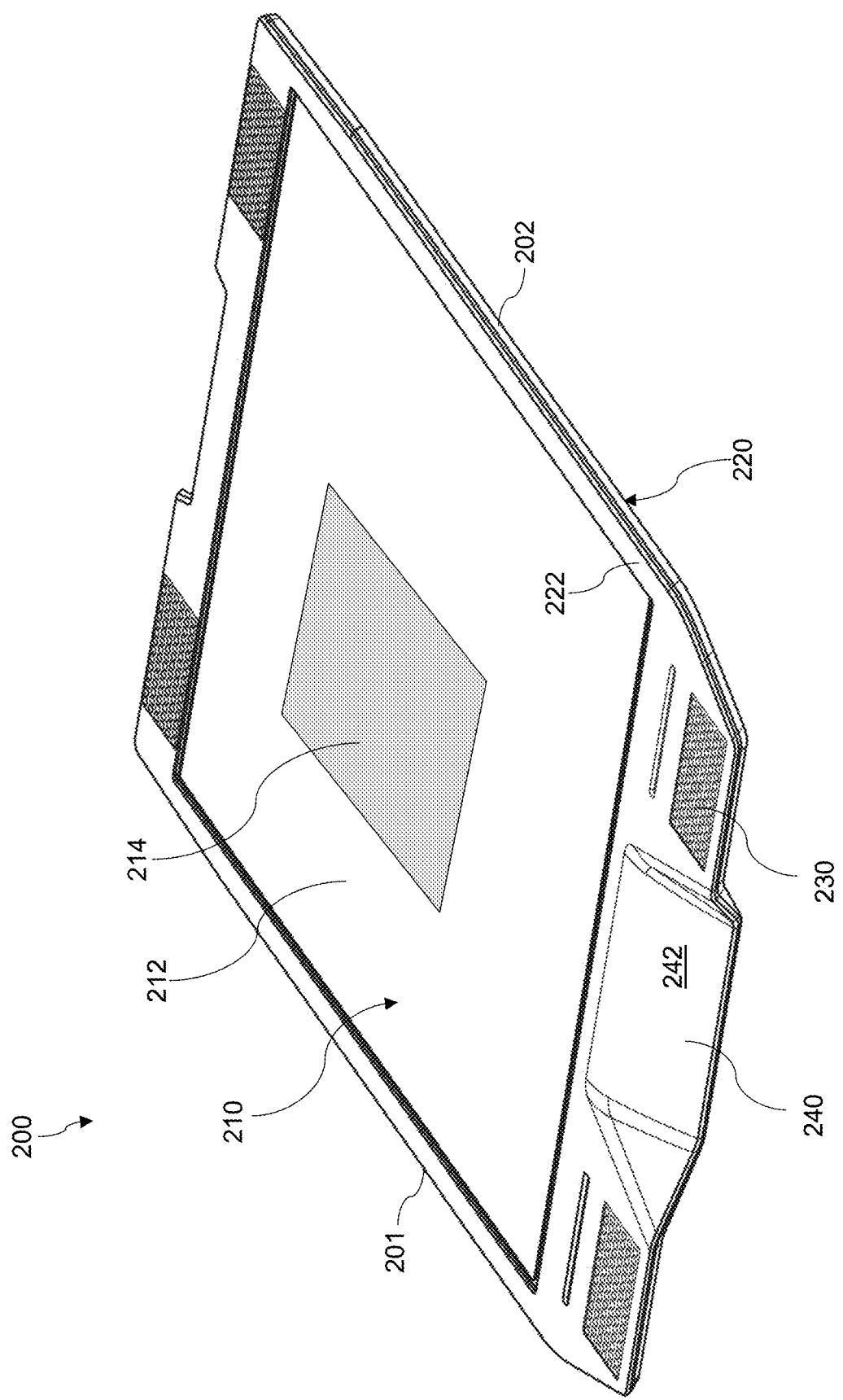
FIG. 2 shows a build plate for a three-dimensional printer.

FIG. 2 shows a build plate for a three-dimensional printer. In general, the build plate 200 may include a sheet 210, a frame 220, one or more tabs 230, and a recess 240 graspable by fingertips of a user of the three-dimensional printer. The build plate 200 may be advantageously sized, shaped, and generally structurally configured for coupling and decoupling with a backbone structure included in a three-dimensional printer. The build plate 200 may also or instead be sized, shaped, and generally structurally configured for other advantages such as establishing adhesion with an initial layer of build material in a three-dimensional print, facilitating removal of an object fabricated on the build plate 200, and providing ease of handling for a user.

In general, the sheet 210 may be secured within, or at least partially bounded by (e.g., fully bounded by), the frame 220. In some aspects, the coupling of the sheet 210 with the frame 220 is permanent—i.e., where the coupling of the sheet 210 with the frame 220 is not structurally configured or otherwise intended for removal of the sheet 210 from the frame 220 and vice-versa. For example, the sheet 210 may be cast into, adhesively bound to, welded onto, or otherwise mechanically attached to the frame 220, e.g., with rivets or other fasteners. In other aspects, the sheet 210 may be removably coupled with the frame 220—e.g., for replacement of one or more of the sheet 210 and the frame 220, or for reversing an exposed surface (e.g., the top surface 212) of the sheet 210. In certain implementations, the sheet 210 may form a majority of the exposed surface or x-y planar dimensions of the overall build plate 200.

The sheet 210 may be formed of an elastically flexible material. That is, the sheet 210 may generally be formed of a material having structural characteristics such that the sheet 210 (and thus the build plate 200 generally) can flex into a relatively concave or convex shape at room temperature when a force is applied by a user—e.g., a user grasping a first end 201 and a second end 202 of the build plate 200 and applying a force thereto—and then the sheet 210 (and thus the build plate 200 generally) can flex back into an at-rest state when the force is no longer applied. The at-rest state may be the state of the build plate 200 shown in FIG. 2, or any other undeformed shape of the build plate 200 such as a shape of the build plate 200 in the absence of external forces. For example, in an aspect, the top surface 212 of the sheet 210 may be substantially planar in the at-rest state of the build plate 200. However, the sheet 210 may be flexible such that the top surface 212 of the sheet 210 can become non-planar (e.g., substantially concave or substantially convex) when a force (such as a torque or point force) is applied to the sheet 210 or build plate 200—e.g., a force normal to the top surface 212 of the sheet 210 that is applied to one or more of the first end 201 and the second end 202 of the build plate 200. As stated above, the overall build plate 200 may generally flex with the sheet 210. That is, the build plate 200 may generally include other components, such as the frame 220, that are formed using elastically flexible materials such that the entire build plate 200 (or a majority of the build plate 200) can flex into a relatively concave or convex shape when a force is applied by a user—e.g., a user grasping a first end 201 and a second end 202 of the build plate 200 and applying a force thereto—and then the build plate 200 can flex back into an at-rest state when the force is no longer applied.

The elastically flexible material of the sheet 210 may include a ferromagnetic metal such as spring steel or any other ferrous alloy or the like. Such a material in the sheet 210 facilitates removable and replaceable coupling of the build plate 200 to a printer with magnetic forces, e.g., by coupling to a ferromagnetic backbone structure included in a three-dimensional printer.

The sheet 210 may generally define an upper surface with one or more build sections thereon—i.e., regions or areas that are structurally configured to receive build material that is deposited in a three-dimensional printing process. For example, the top surface 212 of the sheet 210 (e.g., where the sheet 210 provides an exposed surface that is not encased by the frame 220) may define one or more build sections where material can be deposited to fabricate an object. In one aspect, the entire top surface 212 of the sheet 210 may be exposed to form a build section, and the sheet 210 may be adhered on a lower surface (not shown) to the frame 220. In some aspects, such as aspects where the sheet 210 is reversible (or the build plate 200 itself is reversible relative to a portion of a three-dimensional printer to which the build plate 200 is couplable), both the top surface 212 and a bottom surface (i.e., the opposing surface to the top surface 212) of the sheet 210 may form a build section for the build plate 200. In general, the build section of the sheet 210 may be substantially planar when disposed in an at-rest position or state. Thus, the sheet 210 may have a build section that is substantially planar in the absence of external forces.

In certain implementations, a polycarbonate layer 214 may be disposed over at least one surface of a build section of the sheet 210, or a print surface of the build plate 200 generally. For example, a polycarbonate layer 214 may be disposed over an entire surface (e.g., the entire top surface 212) of the sheet 210. The polycarbonate layer 214 may be structurally configured to establish or promote advantageous adhesion for an initial layer of build material deposited thereon in a three-dimensional printing operation. Such advantageous adhesion may include adhesion such that a printed object adheres to a build section of the sheet 210 for an entire printing operation but can be removed (relatively easily) from the sheet 210 when desired, e.g., by flexing the sheet 210 or build plate 200. By way of example, the polycarbonate layer 214 may include a FR700 polycarbonate sheet or a similar material that is affixed to the sheet 210 as a build surface.

The frame 220 may be disposed around at least a portion of a perimeter of the sheet 210. For example, the frame 220 may be disposed over the entire perimeter of the sheet 210 as shown in FIG. 2. In general, the frame 220 may act as an insulator or barrier to provide a relatively cool surface for handling the build plate 200. For example, the sheet 210 may be made from a first material having a higher thermal conductivity than a second material of the frame 220 (at room temperature or otherwise). Stated otherwise, the sheet 210 may be formed of a first material along its build section, where the first material has a first thermal conductivity and includes a ferromagnetic component, and the frame 220 may be disposed along at least a portion of a perimeter region of the sheet 210, and where the frame 220 includes a second material having a second thermal conductivity that is less than the first thermal conductivity of the first material of the sheet 210. In one aspect, the frame 220 may be at least as flexible as the sheet 210, however, the frame 220 may also be stiffer than the sheet 210, or of about the same stiffness as the sheet 210, provided that the sheet 210 and the frame 220 can elastically flex together and return to an original shape when external forces are relieved. As discussed herein, the second material of the frame 220 may include an elastomeric material, such as a thermoplastic elastomer (TPE) or the like. This elastomeric material may be overmolded onto the sheet 210 (e.g., over a perimeter of the sheet) in order to securely retain the sheet 210 within the frame 220 during handling and flexing. The frame 220 may generally form a gripping surface (e.g., including a handle) for a user to handle, e.g., when removing the build plate 200 from a backbone structure of a three-dimensional printer or when removing a printed object from the build plate 200.

As discussed above, the frame 220 may be formed of an elastomeric material selected so that the frame 220 can elastically flex with the sheet 210. Thus, in certain implementations, in response to torque about any axis extending through the sheet 210 and the frame 220 at room temperature, the sheet 210 may have a first torsional stiffness, and the frame 220 may have a second torsional stiffness less than or equal to the first torsional stiffness of the sheet 210. In another aspect, the sheet 210 may have a torsional stiffness less than the frame 220, or the two may have substantially similar stiffnesses, provided the sheet 210 and frame 220 can flex and relax together during use. It will be appreciated that the elastic modulus is an intensive property of a material, whereas stiffness and torsional stiffness are extensive properties of an object formed of a particular material. As contemplated herein, the frame 220 and sheet 210 may be formed of materials with suitably complementary elastic moduli, or may be fashioned to have suitably complementary stiffness, or some combination of these, provided that the frame 220 and sheet 210 can elastically flex and unflex for use as a build plate 200 as contemplated herein.

Also or instead, as discussed above, the elastomeric material of the frame 220 may have a low thermal conductivity relative to the sheet 210, and the elastomeric material may be positioned to insulate an exposed surface 222 of the frame 220 from a temperature of the sheet 210. For example, the elastomeric material may be positioned such that it is located on a perimeter (e.g., at least an upper perimeter) of the sheet 210. That is, in certain implementations, the frame 220 may be overmolded onto the entire perimeter of the sheet 210. Thus, the frame 220 may be formed of a thermally insulating, elastomeric material selected to flex with the flexible sheet 210 and to insulate an exposed surface of the frame 220 from a temperature of the sheet 210. In this manner, the frame 220 may be cool to the touch, or at least at a lower temperature than the sheet 210, shortly after a three-dimensional printing process is completed. The thermally insulating, elastomeric material of the frame 220 may include one or more of a thermoplastic elastomer (TPE), acrylonitrile butadiene styrene (ABS), or similar.

The frame 220 may define a recess 240 or other grippable feature, which, as stated above, may be graspable by fingertips of a user—e.g., for placement and removal of the build plate 200 within the build volume of a three-dimensional printer. The recess 240 may thus define a handle for the build plate 200, the handle being a location on the build plate 200 sized and shaped for grasping by a user or machine. The recess 240 may define an inclined surface 242 thereon as shown in FIG. 2. Also, or instead, the recess 240 may define one or more openings (not shown in FIG. 2, but such an opening 324 is shown by way of example in FIG. 3) sized and shaped for being graspable by a user, e.g., forming a handle or the like for the build plate 200.

The recess 240 may further be sized and shaped for engagement with a mating portion of a three-dimensional printer, such as a backbone structure disposed within a build volume of a three-dimensional printer. In this manner, the recess 240, or another portion of the build plate 200, may be structurally configured to cooperate with a portion of a three-dimensional printer. To this end, the recess 240 (or another portion of the build plate 200) may include one or more features structurally configured to promote or establish engagement with a portion of a three-dimensional printer such as one or more of notches, protrusions, grooves, sliders, bearings, or other mechanical keying features.

As stated above, the build plate 200 may include one or more tabs 230. Such a tab 230 may at least be partially formed of the elastomeric material of the frame 220. The one or more tabs 230 of the elastomeric material may extend from, or be depressed into, the frame 220 to provide gripping surfaces for the build plate 200, e.g., gripping surfaces for aiding in removal of the build plate 200 from a backbone structure of the three-dimensional printer. In certain implementations, each of the tabs 230 may have a first surface roughness, where one or more other portions of the frame 220 excluding the tabs 230 has a second surface roughness that is less than the first surface roughness of the tabs 230. In other words, the tabs 230 may be structurally configured to provide a greater roughness than other portions of the frame 220, which can provide greater friction to ease in gripping the build plate 200 using the tabs 230.

The tabs 230 may be coupled to the frame 220 as described above. In this manner, each tab 230 may be thermally insulated from the first material of the sheet 210 by at least the second material of the frame 220. Thus, because each tab 230 may be graspable by a user to move the build plate 200, the tabs 230 may have a temperature suitable for human touch (relative to the sheet 210) when the sheet 210 is in a heated stated (e.g., a heated state stemming from being disposed within a heated build volume of a three-dimensional printer, a heated state because of heat exchange provided from a relatively hot extruded build material, a heated state stemming from direct heating of the sheet 210, and combinations thereof).

The build plate 200 in certain aspects may thus include a laser spring steel sheet 210 (or similar material) overmolded with another material to provide a frame 220 (e.g., a polycarbonate (PC) acrylonitrile butadiene styrene (ABS) material), and a polycarbonate (or similar material) material may be adhered to a surface of the sheet 210 to improve first layer adhesion during a three-dimensional printing operation.

Figure 3:
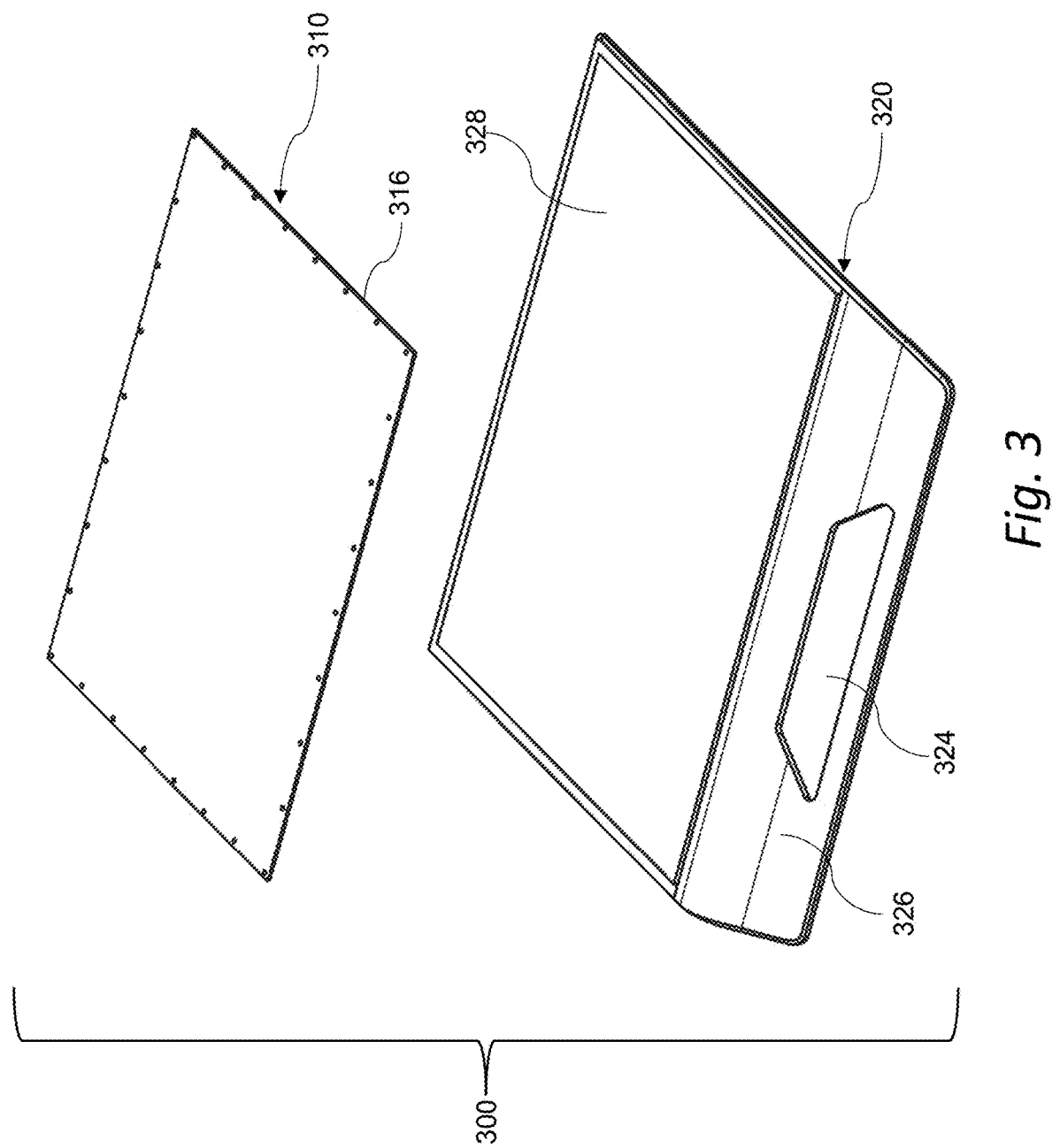
FIG. 3 shows an exploded view of a build plate for a three-dimensional printer.

FIG. 3 shows an exploded view of a build plate for a three-dimensional printer. Specifically, FIG. 3 shows the sheet 310 separated from the remainder of the build plate 300, such as the frame 320. This exploded view is shown for clarity to emphasize that the sheet 310 and the frame 320 may be separate, distinct components of the build plate 300. As discussed herein, in certain implementations, the sheet 310 is removable from the frame 320, and thus the exploded view of FIG. 3 shows the sheet 310 removed from the frame 320 in such an embodiment. In certain aspects, the sheet 310 may fit within a recess 328 of the frame 320, or the frame 320 may be overmolded around or onto the sheet 310. In other aspects, the sheet 310 may occupy a void of the frame 320—e.g., where the frame 320 is disposed around a perimeter 316 of the sheet 310, and the sheet 310 is coupled to the frame 320 through some other perimeter attachment structure such as a gasket, 1-bracket, or the like.

The build plate 300 shown in FIG. 3 may be similar to the build plate 200 shown in FIG. 2, and may thus include any of the features of the build plate 200 described above with reference to FIG. 2. As illustrated in FIG. 3, the build plate 300 may include an opening 324 defined by the frame 320—e.g., located on an inclined surface 326 defined by the frame 320. These features may be structurally configured to aid in gripping or grasping of the build plate 300, as well as for engagement of the build plate 300 with a portion of a three-dimensional printer, such as a backbone structure disposed within a build volume of a three-dimensional printer. While the opening 324 may be included on an inclined surface 326 as shown, e.g., for ergonomic or aesthetic reasons, the opening 324 may also or instead be included on a surface coplanar with or parallel to the sheet 310 that provides the build surface.

Figure 4:
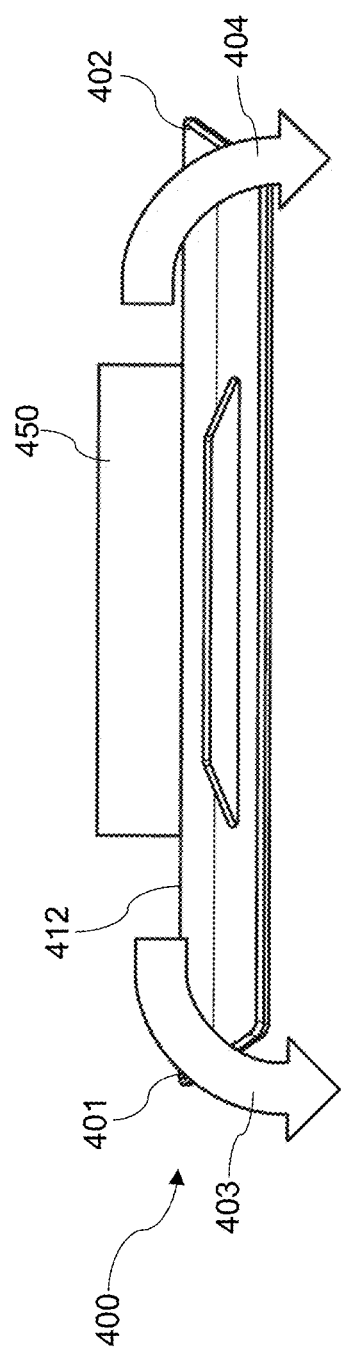
FIG. 4 shows a build plate with a printed object disposed thereon.
Figure 5:
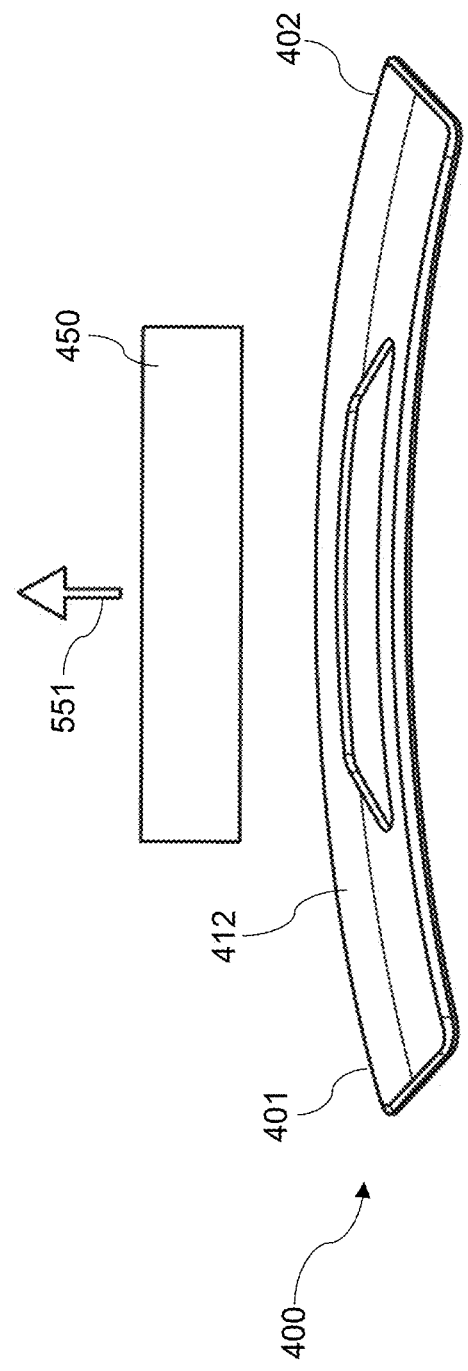
FIG. 5 shows the build plate of FIG. 4 with the printed object removed therefrom.

FIG. 4 shows a build plate with a printed object disposed thereon, and FIG. 5 shows the build plate of FIG. 4 with the printed object removed therefrom. The build plate 400 of FIGS. 4 and 5 may be the same as or similar to any of those described herein, e.g., the build plates described above with reference to FIGS. 2 and 3. That is, the build plate 400 may be formed of one or more flexible materials (e.g., a first material forming at least part of a flexible sheet, and a second material forming at least part of a flexible frame disposed around at least a portion of the flexible sheet, such as around a perimeter thereof). Advantageously, the build plate 400 may flex to promote a release of a printed object 450 disposed thereon, which may adhere to the top surface 412 of the build plate 400 during a three-dimensional printing operation. Thus, by flexing the surface area of the build plate 400 in contact with the printed object 450, a user may quickly and easily remove a relatively rigid object coupled thereto.

FIG. 4 shows the build plate 400 in an at-rest position or state. In this at-rest state, the top surface 412 of the build plate 400, which may include a build section for receiving deposited build material when forming an object 450 in a three-dimensional printing operation, may be substantially planar—e.g., within 0.2-0.4 mm of z-axis excursion from a completely planar or flat surface, or deviating from planar by less than the minimum z-axis printing increment for a print process, or sufficiently planar to avoid human-observable deviations from an intended net shape. Because the build plate 400 is formed of flexible materials, however, an applied force may cause the top surface 412 of the build plate 400 to flex or otherwise deform with excursions beyond an otherwise substantially planar form. For example, and as demonstrated in FIGS. 4 and 5 when viewed in sequence, forces applied at the ends of the build plate 400 can cause the top surface 412 of the build plate 400 to become substantially concave or convex. That is, as shown in FIG. 4, forces may be applied to flex the first end 401 and the second end 402 of the build plate 400 in the direction of a first arrow 403 and a second arrow 404, respectively. In this manner, the applied forces may deform the build plate 400 into a flexed state with a concave top surface 412 to remove, or to facilitate removal of the object 450 therefrom. Flexing the build plate 400 in this manner may promote disengagement of the object 450 from the top surface 412 of the build plate 400, e.g., in the direction of the arrow 551 in FIG. 5. Thus, in use, the build plate 400 may be flexed or otherwise torqued (e.g., by hand) to help remove a printed object 450 from the build plate 400. Suitable forces may also or instead be automatically (e.g., robotically) applied to the build plate 400 at the completion of a print in order to facilitate full or partial disengagement of objects 450 prior to human interaction.

Figure 6:
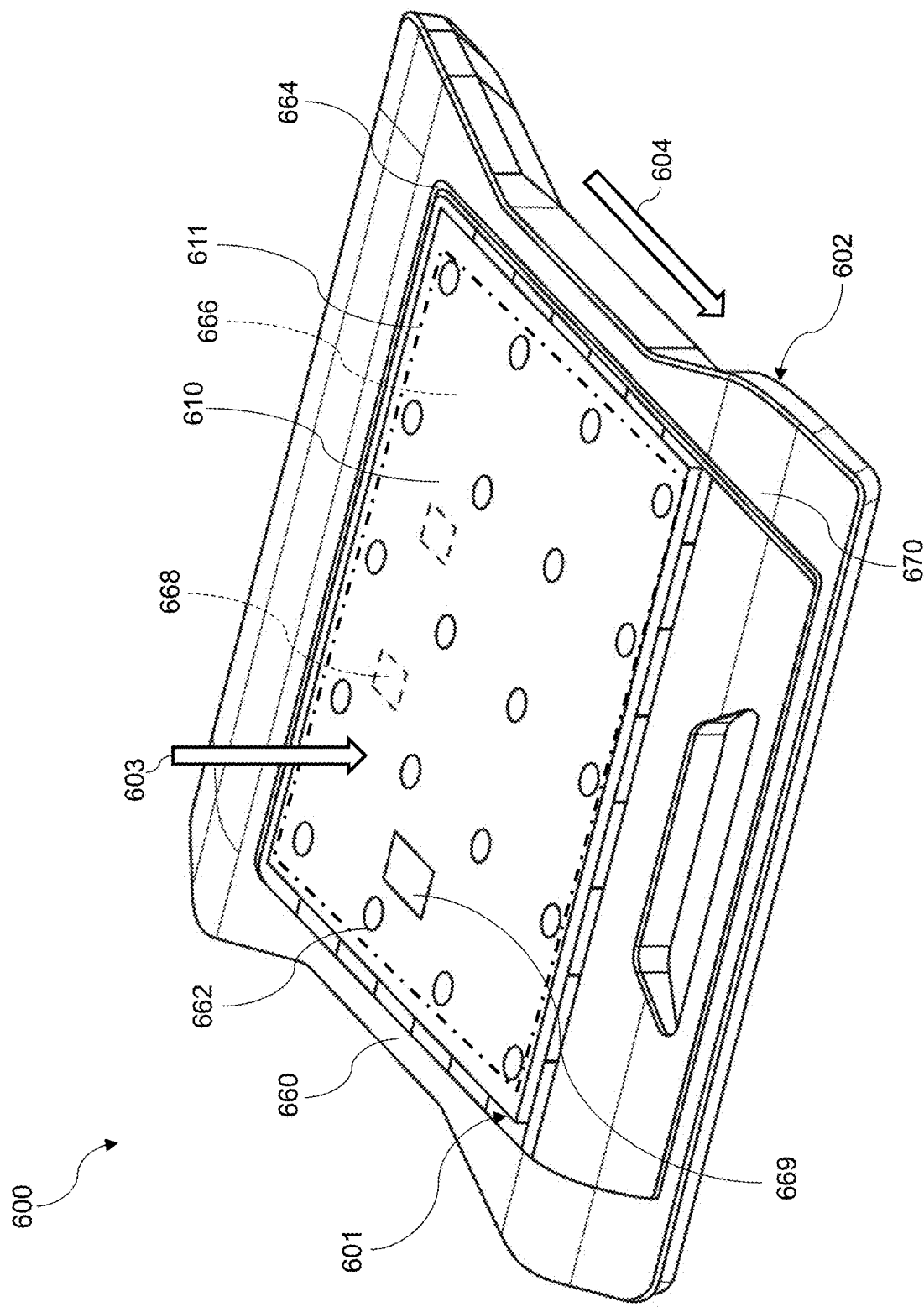
FIG. 6 shows a build plate system of a three-dimensional printer.

FIG. 6 shows a build plate system of a three-dimensional printer. The system 600 may generally include a build plate 601 for receiving deposited build material during a three-dimensional printing operation using a three-dimensional printer, and a backbone structure 602 for supporting the build plate 601 within the three-dimensional printer. It will thus be understood that the backbone structure 602 may be included in a three-dimensional printer, such as any of those described herein, and may, in various embodiments of the three-dimensional printer, be movable within a build volume of the printer or stationary within the build volume of the printer.

The build plate 601 may be the same as or similar to one or more of the other build plates described herein. In general, the build plate 601 may include a sheet 610 having a build section 611 (shown, for example, as a printable top surface bounded by the dot-dashed line in FIG. 6), where the build section represents the area(s) of the build plate 601 structurally configured, e.g., by material selection and surface texture, to receive deposited build material during a three-dimensional printing process. The sheet 610 may include a ferromagnetic material in or adjacent to the build section 611. In this manner, the sheet 610, and thus the build plate 601 generally, may be configured for coupling via a magnetic force to another component, such as the backbone structure 602, which may include one or more cooperating magnetic components such as fixed magnets or electromagnets.

The backbone structure 602 may include a body 660 and a plurality of magnets 662 supported by the body 660. For example, the backbone structure 602 may include a single magnet 662 in an embodiment, although two or more magnets 662 may be preferable. For example, the magnets 662 may be distributed to contact the build plate 601 around a perimeter of the ferromagnetic material of the sheet 610, or positioned at the corners of the sheet, or distributed in a regular geometric array, or in any other manner suitable for magnetically retaining the build plate 610 in place on the backbone structure 602. In this manner, the build plate 601 may be coupled to the backbone structure 602 via magnetic forces exerted in a first direction 603 (e.g., normal to the build plate 601) acting on the ferromagnetic component along the build section 611 of the sheet 610. Thus, in certain embodiments, a magnetic force may establish the coupling between the build plate 601 and the backbone structure 602.

The magnetic force may also or instead assist in establishing a predetermined orientation or alignment of the build plate 601, e.g., relative to the backbone structure 602 or another component of the three-dimensional printer. Such a predetermined orientation or alignment of the build plate 601 may include a predetermined surface shape for the build plate, such as where the build section 611 (e.g., the entire top surface) is substantially planar. In this manner, the body 660 of the backbone structure 602 may have a substantially planar surface 666 that includes the plurality of magnets 662 arranged to secure the ferromagnetic component of the build plate 601 (e.g., a ferromagnetic metal material from which the sheet 610 of the build plate 601 is made) in a position on the planar surface 666 within the three-dimensional printer during a fabrication process. For example, when coupled to the backbone structure 602 via the magnetic force, the build section 611 of the sheet 610 of the build plate 601 may be generally flat, with excursions not exceeding 0.4 mm from planar, or optionally 0.2 mm from planar, at a temperature of about 80° Celsius.

In certain implementations, the plurality of magnets 662 are movable on the backbone structure 602, e.g., to alter or refine the orientation or alignment of the build plate 601. Also, or instead, the plurality of magnets 662 may be placed along the backbone structure 602 in a predetermined manner to enforce a desired surface shape for the flexible sheet 610 (e.g., where the surface shape is 0.2-0.4 mm from planar). Thus, magnets 662 placed on or embedded within one or more of the build plate 601 and backbone structure 602 may provide a force securing the sheet 610 to the backbone structure 602 (e.g., a force oriented in the first direction 603 as shown in the figure). And, in certain implementations, by adjusting the spacing and location of the magnets 662, the securing force may be adjusted, e.g., to be greater towards the edges of the build plate 601 or to be substantially uniform throughout the build plate 601.

In addition to, or in lieu of, the magnetic couplings between the build plate 601 and the backbone structure 602 described above, other mechanical features for engagement of the build plate 601 and the backbone structure 602 may be utilized. These features may be included, for example, within the build plate 601 and/or the backbone structure 602. For example, the backbone structure 602 may define a cutout 664 or the like that is sized and shaped to receive the build plate 601 (or a portion thereof) therein. Such a cutout 664 may assist in establishing a predetermined alignment of the build plate 601 relative to the backbone structure 602. Additionally, or alternatively, the backbone structure 602 and the sheet 610 may include complementary mechanical anchors 668 arranged to secure the sheet 610 in a certain position on the backbone structure 602 during a fabrication process.

In general, the structural configuration (e.g., the size, shape, positioning of the magnets 662, and so on) of the backbone structure 602 and the sheet 610 may promote relatively easy coupling and decoupling of the sheet 610 and the backbone structure 602 within a build volume of a three-dimensional printer. For example, the sheet 610 of the build plate 601 may be slidable relative to the body 660 of the backbone structure 602 in a second direction 604 perpendicular to the first direction 603 of a magnetic force that couples the backbone structure 602 and the build plate 601 and/or parallel to the sheet 610. That is, the body 660 of the backbone structure 602 may include a substantially planar surface 666 as described herein, and the sheet 610 of the build plate 601 may be slidable relative to the body 660, in the second direction 604, along the substantially planar surface 666. This may be advantageous for a user to grasp the build plate 601 and slide the build plate 601 along the second direction 604 for removal of the build plate 601 relative to the backbone structure 602. Also or instead, a user may grasp the build plate 601 and lift the build plate 601 (in a direction opposing the first direction 603) for removal of the build plate 601 relative to the backbone structure 602, e.g., essentially peeling the build plate 601 from the backbone structure 602.

The sheet 610 of the build plate 601 may also or instead be slidable (or otherwise movable) relative to the body 660 of the backbone structure 602 (e.g., in the second direction 604) under force of thermal expansion of the sheet 610 of the build plate 601. In this manner, the structural configuration of the backbone structure 602 and the sheet 610 may allow for thermal expansion of one or more of these components without decoupling the components or buckling the build section 611 or the sheet 610 during thermal cycling.

The sliding capability of the build plate 601 relative to the backbone structure 602 may be further aided by other features, e.g., by incorporating features such as a groove, an incline, a bearing, a wheel, a slider, and the like into the build plate 601 and/or the backbone structure 602. For example, the system 600 may include a ramp 670 on (or adjacent to) the substantially planar surface 666 of the body 660 of the backbone structure 602. The ramp 670 may extend in a direction away from the substantially planar surface 666 and be oriented to separate a region of the build plate 601 from the backbone structure 602, e.g., in the z-axis direction relative to an x-y plane of the build plate 601, as the build plate 601 is moved in the direction away from the substantially planar surface 666, such as in a sliding motion in the second direction 604 as a user pulls a handle formed by an opening.

The system 600 may usefully incorporate one or more sensors 669. For example, one or more of the backbone structure 602 and the sheet 610 may include a sensor 669 that can detect and transmit certain information to a controller (such as any of those described herein) for adjustments to the system 600 or the three-dimensional printer. Such sensed information may include without limitation one or more of a temperature, a position or orientation of the sheet 610, a surface shape of the sheet 610, a weight or other force on the sheet 610, a predetermined coupling or alignment (or lack thereof), and so on.

Figure 7:
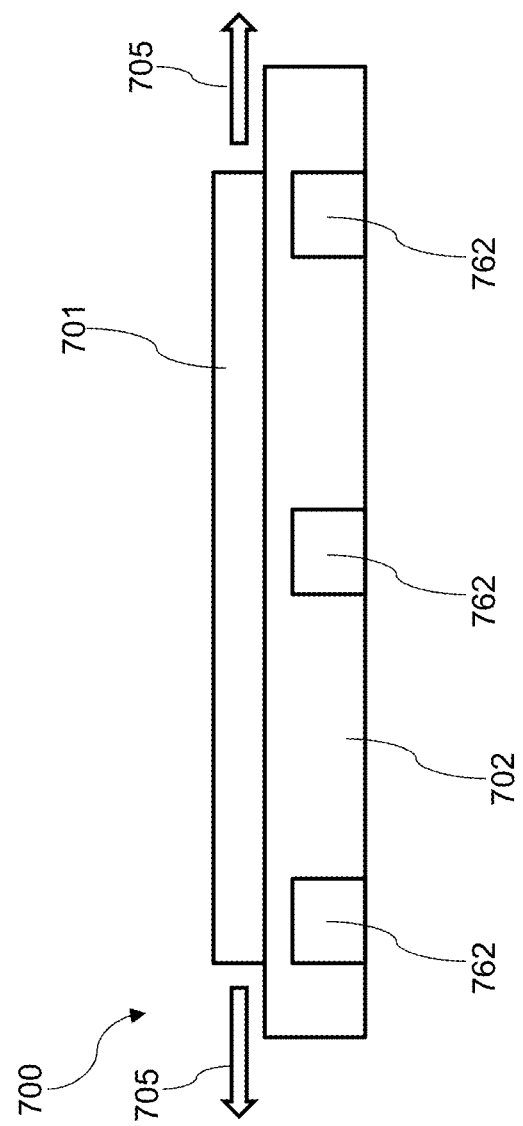
FIG. 7 is a cross-sectional view of a representation of a build plate system.

FIG. 7 is a cross-sectional view of a representation of a build plate system. The system 700 of FIG. 7 may be the same as or similar to that shown in FIG. 6, where the system 700 includes a build plate 701, a backbone structure 702, and one or more magnets 762. This figure shows how the system 700 may permit thermal expansion of the build plate 701, e.g., in the direction of the arrows 705, while maintaining a predetermined surface shape of the build plate 701 (e.g., by preventing or mitigating bowing of the build plate 701). That is, in contrast to a mechanically anchored system where there is a chance that a build plate, when heated such that it expands, becomes over constrained and bows upwards thereby warping the print surface, a magnetically-coupled configuration (such as that shown in the figure) may allow the build plate 701 to expand and slide relative to the backbone structure 702 without causing such bowing. Thus, magnetic attachment may be preferable over mechanical anchoring, in particular for build plates 701 having a coefficient of thermal expansion significantly different (either isotropically or anisotropically) from an associated backbone structure 702. A combination of magnetic and mechanical techniques may also or instead be employed.

Figure 8:
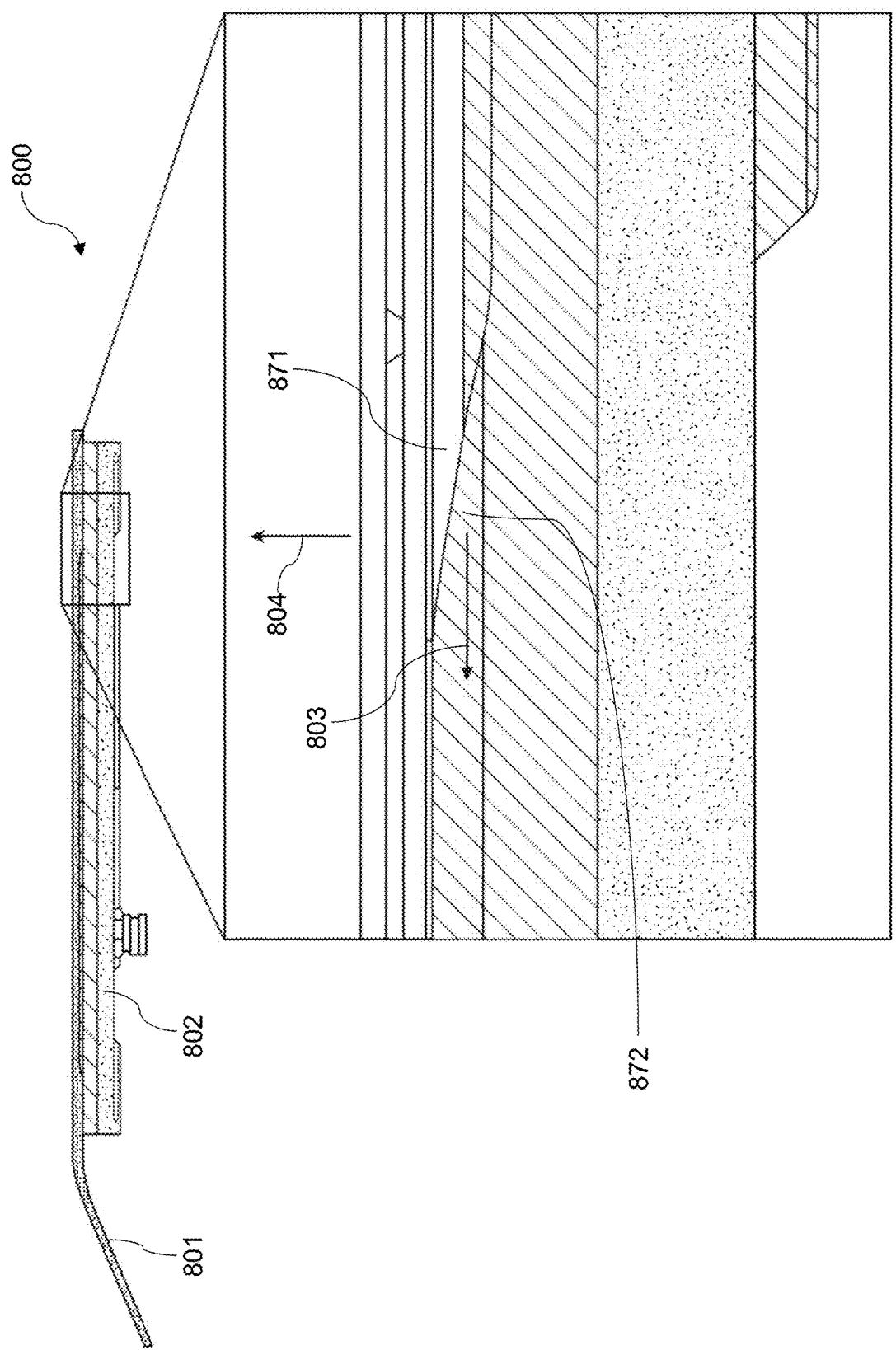
FIG. 8 shows a cross-sectional view of a build plate system.

FIG. 8 shows a cross-sectional view of a build plate system. The system 800 of FIG. 8 may be the same as or similar to that shown in FIGS. 6 and 7. FIG. 8 emphasizes certain features that facilitate removal of the build plate 801 from a backbone structure 802. Specifically, the system 800 may include one or more ramped portions on the build plate 801 and/or the backbone structure 802. For example, the build plate 801 may include a first ramp 871 and the backbone structure 802 may include a second ramp 872, where each of these ramped portions are structurally configured to cooperate with one another during a process for removing the build plate 801 from the backbone structure 802. That is, when a force is acting on the build plate 801 in one or more of a first direction 803 or a second direction 804, the second ramp 872 may provide a surface upon which the first ramp 871 can slide with minimal encumbrances. These ramped surfaces may be structurally configured to have a relatively low coefficient of friction therebetween (e.g., through material selection) to promote such sliding or other movement when the build plate 801 is displaced in the first direction 803 (e.g., horizontally toward a handle of the build plate 801), so that the two opposing ramps (the first ramp 871 and the second ramp 872) can, with significant mechanical advantage, displace the build plate 801 in a z-axis direction away from the backbone structure 802. This may be particularly useful where, each of the build plate 801 and the backbone structure 802 are engaged with one another by magnetic forces that require substantial force for an initial separation. In this configuration, as the build plate 801 slides against the ramp features in the first direction 803, it may be lifted upwards in the second direction 804, thereby reducing magnetic coupling and making the build plate 801 relatively easy to remove from the backbone structure 802.

Figure 9:
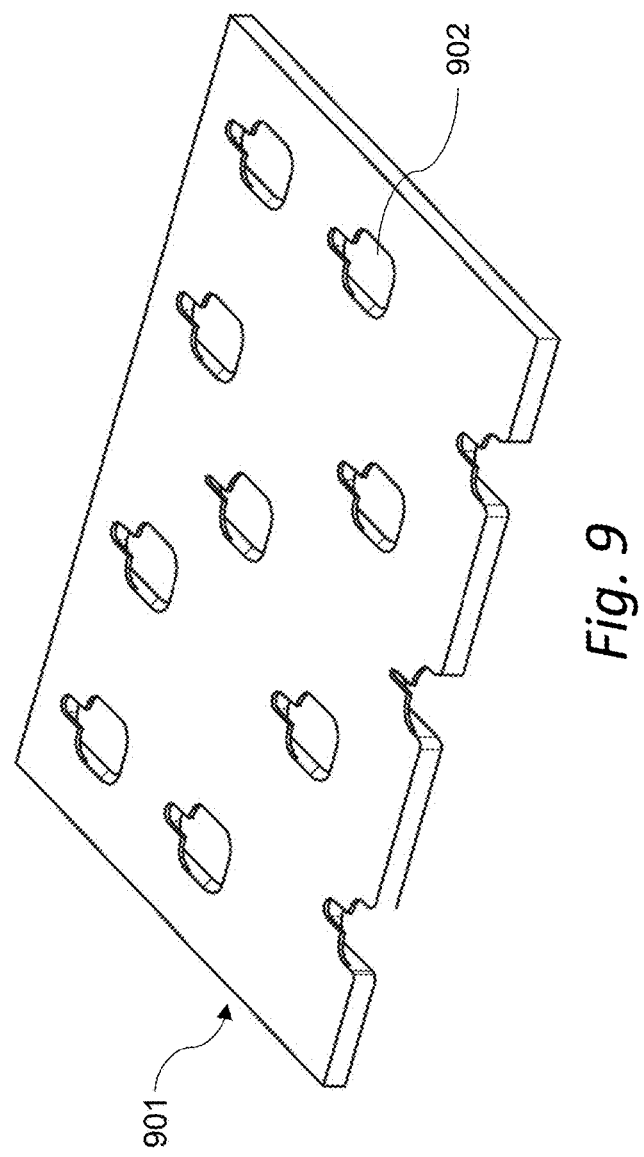
FIG. 9 shows mechanical features for coupling a build plate and a backbone structure in a build plate system.
Figure 10:
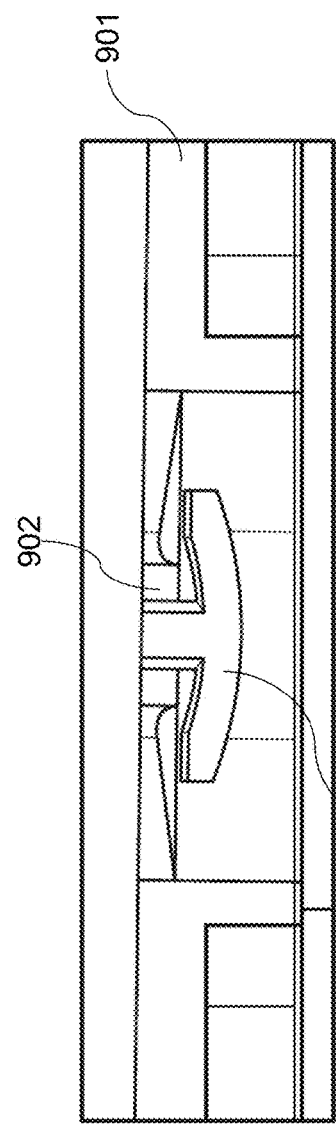
FIG. 10 is a cross-sectional view of mechanical features for coupling a build plate and a backbone structure in a build plate system.

FIG. 9 shows mechanical features for coupling a build plate and a backbone structure in a build plate system, and FIG. 10 is a cross-sectional view of mechanical features for coupling a build plate and a backbone structure in a build plate system. Specifically, FIG. 9 shows a surface 901 defining a plurality of openings 902 for receiving a mechanical anchor, and FIG. 10 shows the surface 901 with an anchor 1004 docked within such an opening 902. In certain embodiments, one or more anchors 1004 are provided on a bottom surface of a build plate, and a backbone structure includes the surface 901 with the openings 902 for receiving the one or more anchors 1004 of the build plate during coupling. It will be understood, however, that either or both of the build plate and the backbone structure may also or instead include one or more of an anchor 1004 or a surface 901 with an opening 902 for receiving an anchor 1004. Such mechanical features for coupling a build plate and a backbone structure in a build plate system may be provided in addition to, or instead of, the magnetic coupling described elsewhere herein. In operation, the build plate may be vertically lowered onto the backbone structure with the anchors 1004 (which may be on the build plate or the backbone structure) aligned with the openings 902 of the opposing surface. The build plate may then be moved horizontally to engage arms of the anchor 1004 with flanges of the opening 902 in a manner that secures the build plate against vertical displacement. Thus, a build plate may include an anchored plate that horizontally and slidably engages with a backbone structure. In one aspect, the backbone structure may be formed of aluminum (or other non-ferrous material(s)) and the build plate may be a plastic, flexible plate (or similar) disposed thereon.

FIG. 11 is a flow chart of a method for using a build plate system of a three-dimensional printer. The method 1100 may, for example, be implemented utilizing any of the build plate systems, build plates, backbone structures, and the like described herein or any corresponding hardware for receiving a three-dimensionally printed object onto a removable and replaceable substrate. For example, the method 1100 may use a build plate including a flexible, magnetic build surface structurally configured to couple with magnets of a backbone structure of the three-dimensional printer.

As shown in step 1102, the method 1100 may include coupling a build plate to a backbone structure of a three-dimensional printer. This coupling may occur within the build volume of the three-dimensional printer. For example, the backbone structure may be disposed within the build volume of a three-dimensional printer, and the build plate may be inserted into or onto the backbone structure. The coupling of the build plate and backbone structure may use, or may be wholly accomplished via, a magnetic force between the build plate and the backbone structure. This magnetic force may be exerted in a first direction on a build section of the build plate, e.g., normal to a top surface of the build plate, where the top surface defines the build section of the build plate.

Coupling of the build plate and backbone structure may also or instead include a mechanical coupling, such as where the backbone structure defines a cutout for receiving the build plate. Additionally, or alternatively, one or more of the build plate and the backbone structure may include one or more of mechanical anchors and cooperating openings for receiving the mechanical anchors, where these or other mechanical features engage with one another to establish or promote the coupling of the build plate and backbone structure.

As shown in step 1104, the method 1100 may include delivering a build material along the build section of the build plate coupled to the backbone structure. This may include extruding a melted (or partially melted) build material onto the build plate via an extruder of a three-dimensional printer for forming a three-dimensional object on the build plate. For example, a build material may be heated to a glass transition temperature (e.g., 150° Celsius or greater), and/or the build plate itself may be heated (e.g., 40° Celsius or greater), during a three-dimensional printing operation. Thus, in certain implementations, delivering the build material along the build section of the build plate includes thermally expanding the build plate, where a force of thermal expansion of the build plate may displace the build section relative to the backbone structure. Under such heating, the coupling described above may usefully retain a surface of the build plate sufficiently level for fabrication, e.g., with vertical excursions not exceeding about 0.2 to 0.4 mm, e.g., at a temperature at or about 80° Celsius.

As shown in step 1106, the method 1100 may include decoupling the build plate from the backbone structure, e.g., after fabrication is complete, and with a printed object formed of the build material on the build section of the build plate. Decoupling the build plate from the backbone structure may be accomplished in whole or in part through a movement such as sliding the build plate relative to the backbone structure in a direction perpendicular to magnetic forces coupling the backbone structure and the build plate. For example, decoupling the build plate from the backbone structure may include moving the build plate along a ramp defined by the backbone structure as described above, e.g., with the ramp providing a predetermined incline angle and length such that a sliding motion promotes vertical movement when the build plate is moved horizontally along the backbone structure (e.g., from a pulling force on the build plate).

As shown in step 1108, the method 1100 may include removing the build material from the build section of the build plate decoupled from the backbone structure. This may include providing a torque to the build plate. For example, a user may grasp opposing ends of the build plate and apply a force such that the build plate, which may be constructed of an elastically flexible material (such as a ferromagnetic metal, e.g., spring steel), bows into a concave or convex shape thereby separating from a rigid surface of an object formed of the build material.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A build plate for a three-dimensional printer, the build plate comprising:
a sheet of an elastically flexible material including a ferromagnetic metal;
a frame around a perimeter of the sheet, wherein a top surface of the sheet is exposed to form a build section within the perimeter for the three-dimensional printer, the frame formed of an elastomeric material that elastically flexes with the sheet, the elastomeric material having a second thermal conductivity that is less than a first thermal conductivity of the sheet, and the elastomeric material positioned to insulate an exposed surface of the frame from a temperature of the sheet; and
one or more tabs of the elastomeric material extending from the frame to provide gripping surfaces for removal of the build plate from the three-dimensional printer.

2. The build plate of claim 1, wherein the frame defines a recess graspable by fingertips of a user.

3. The build plate of claim 1, wherein each of the one or more tabs has a first surface roughness, and the frame has a second surface roughness less than the first surface roughness.

4. The build plate of claim 1, further comprising a polycarbonate layer disposed over at least one surface of a build section of the sheet.

5. The build plate of claim 1, wherein the ferromagnetic metal includes spring steel.

6. A build plate for a three-dimensional printer, the build plate comprising:
a sheet having a top surface exposed to form a build section, the build section substantially planar in the absence of an external force, the sheet formed of a first material along the build section, the first material including a ferromagnetic component, and the first material having a first thermal conductivity;
a frame disposed entirely around a perimeter of the sheet, the frame at least as flexible as the sheet, and the frame including a second material having a second thermal conductivity less than the first thermal conductivity of the first material; and
one or more tabs coupled to the frame, each tab thermally insulated from the first material of the sheet by at least the second material of the frame, and each tab graspable by a user to move the build plate.

7. The build plate of claim 6, wherein, in response to torque about any axis extending through the sheet and the frame at room temperature, the sheet has a first torsional stiffness, and the frame has a second torsional stiffness less than or equal to the first torsional stiffness of the sheet.

8. The build plate of claim 6, wherein the second material of the frame includes an elastomeric material.

9. The build plate of claim 8, wherein the second material includes a thermoplastic elastomer.

10. A build plate system of a three-dimensional printer, the build plate system comprising:
a build plate including a sheet having top surface that is exposed to form a build section, the sheet formed of a first material including a ferromagnetic component along the build section;
a frame around a perimeter of the sheet, the frame formed of an elastomeric material that elastically flexes with the sheet, the elastomeric material having a second thermal conductivity that is less than a first thermal conductivity of the first material of the sheet, and the elastomeric material positioned to insulate an exposed surface of the frame from a temperature of the sheet; and
a backbone structure including a body and a plurality of magnets supported by the body, the build plate coupled to the backbone structure via a magnetic force of the plurality of magnets exerted in a first direction on the ferromagnetic component along the build section of the sheet, and the sheet of the build plate slidable relative to the body in a second direction perpendicular to the first direction of the magnetic force.

11. The build plate system of claim 10, wherein the sheet of the build plate is slidable relative to the body in the second direction under force of thermal expansion of the sheet of the build plate.

12. The build plate system of claim 10, wherein the body of the backbone structure includes a substantially planar surface, and the sheet of the build plate is slidable relative to the body, in the second direction, along the substantially planar surface.

13. The build plate system of claim 12, further comprising a ramp on the substantially planar surface and extending in a direction away from the substantially planar surface, the ramp oriented to separate a region of the build plate from the backbone structure as the build plate is moved in the direction away from the substantially planar surface.

14. The build plate system of claim 10, wherein the build section of the sheet of the build plate coupled to the backbone structure via the magnetic force has a flatness of greater than about 0.2 mm and less than about 0.4 mm from planar at a temperature of about 80° Celsius.

* * * * *